March 30, 1965
J. A. MARLAND
3,175,667
ONE-WAY CLUTCH WITH SPLASH AND GRAVITY
FLOW LUBRICATING SYSTEM
Filed Aug. 7, 1961
3 Sheets-Sheet 2
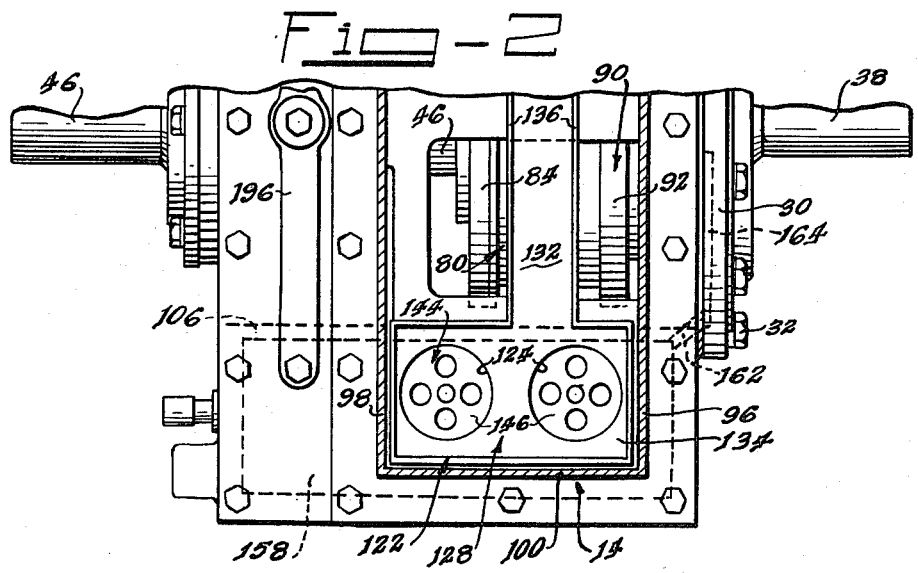
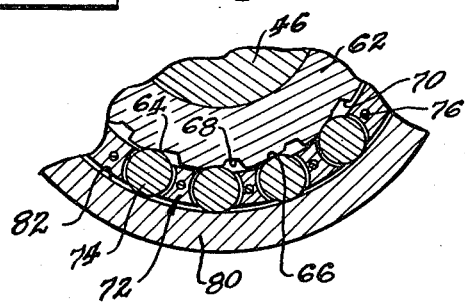
INVENTOR.
Joseph A. Marland
BY
Stone, Nierman
Burmeister & Zummer
Attorneys March 30, 1965
J. A. MARLAND
3,175,667
ONE-WAY CLUTCH WITH SPLASH AND GRAVITY
FLOW LUBRICATING SYSTEM
Filed Aug. 7, 1961
3 Sheets-Sheet 3
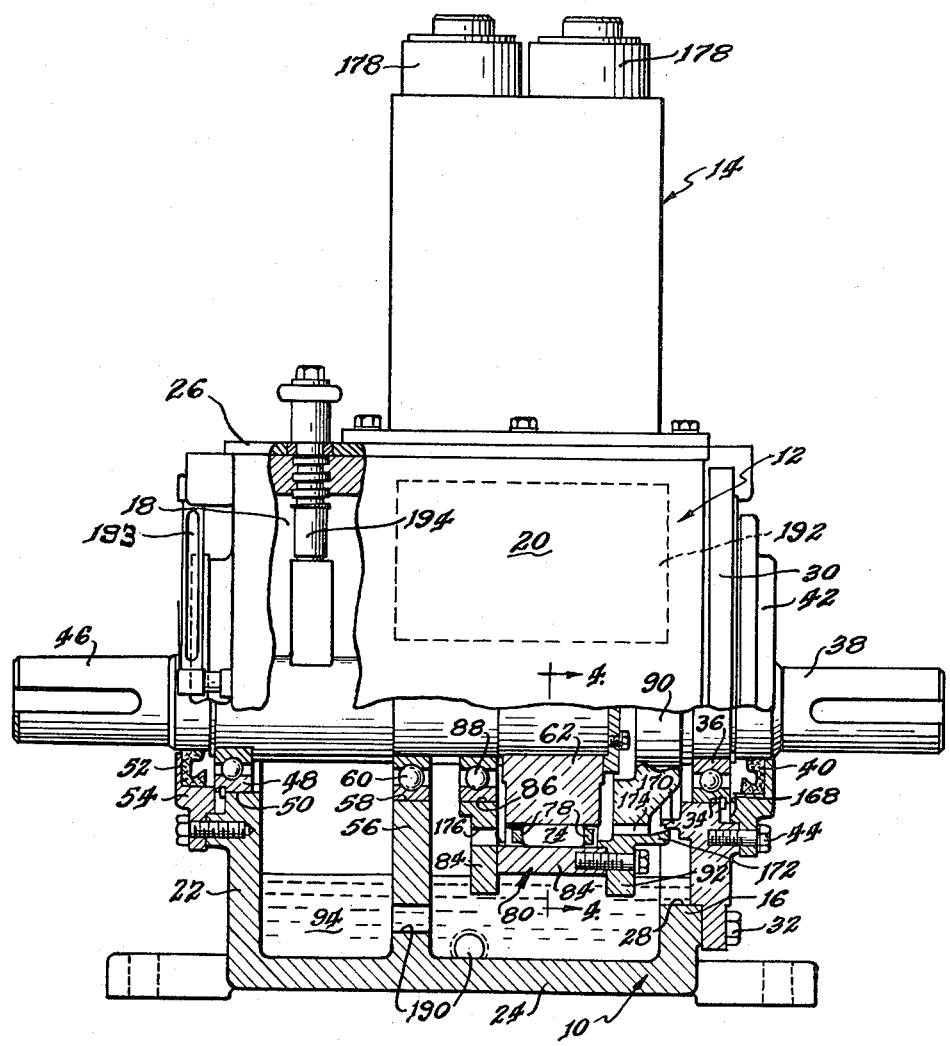
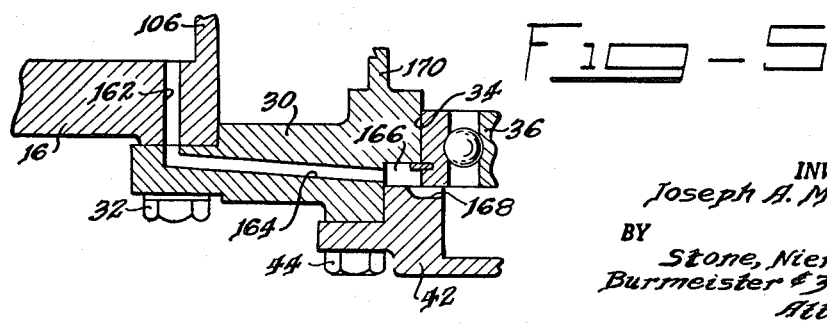
INVENTOR.
Joseph A. Marland
BY
Stone, Nierman,
Burmeister & Zummer
Attorneys

United States Patent Office 3,175,667
Patented Mar. 30, 1965

3,175,667
ONE-WAY CLUTCH WITH SPLASH AND GRAVITY FLOW LUBRICATING SYSTEM
Joseph A. Marland, P.O. Box 388, La Grange, Ill.
Filed Aug. 7, 1961, Ser. No. 129,841
8 Claims. (Cl. 192—113)

The present invention relates to one-way clutches, and more particularly to the combination of a one-way clutch and housing. This application is a continuation-in-part of application Serial No. 112,453 of the present inventor and Charles W. Hill entitled "One-Way Clutch" filed on May 24, 1961.

One-way clutches are conventionally either of the roller bearing or sprague type. In both types, driving elements or wedges are disposed between coaxially mounted inner and outer races, and the driving elements become wedged between the races when torque is applied in one direction and disengage when torque is applied in the other direction. In the sprague type of clutch, the driving elements are of non-cylindrical form, and the inner and outer races are cylindrical. In the roller type clutch, either the inner or outer race is provided with indentations forming inclined planes, and the rollers rotate in these indentations, becoming wedged between the races for rotational torques in the driving direction. The present invention may be practiced with either the sprague type or roller bearing type of clutch.

Patent No. 2,988,113, of the present inventor entitled "One-Way Clutch," Serial No. 731,411, filed April 28, 1958, discloses a roller bearing clutch provided with lubrication means. In the clutch disclosed in this patent application, a plurality of roller bearings are disposed between inner and outer races, and a lubrication tube extends from an oil reservoir into an annular opening coaxially disposed about the shaft coupled to the clutch to permit small drops of oil to fall within the clutch housing. These drops of oil work their way through the inner and outer races to adequately lubricate the roller bearings and the races.

A one-way clutch lubricated in this manner is entirely satisfactory unless operated in a particularly dirty or dusty atmosphere, in which case dirt enters through the opening in the clutch housing and creates a greasy sludge within the one-way clutch. Eventually, the clutch must be disassembled, and the dirt and residual oil cleaned from the clutch or the clutch will wear excessively. Also, moisture enters into the clutch housing through the oil opening, and under circumstances of high humidity, moisture has been found to cause a sludge to develop within the clutch housing. Further, maintenance workers occasionally permit the oil reservoir to run dry, and under these circumstances, the clutch will not receive adequate lubrication.

In the above referred to patent application of the present inventor and Charles W. Hill, a one-way clutch is disclosed which is disposed with a housing, the housing being sealed about the shafts of the one-way clutch by a labyrinth seal. The housing contains an oil reservoir which receives oil as a result of a spray caused by rotation of the one-way clutch within the housing, and oil from the reservoir is conducted to the one-way clutch through one or more tubes.

It is an object of the present invention to provide a one-way clutch and housing assembly in which the shaft for the clutch is mounted within the wall of the housing by a bearing, and both the clutch and the bearing are lubricated in a positive and direct manner. Specifically, it is an object of the present invention to provide a one-way clutch and housing in which both the bearing and clutch receive lubrication from an oil reservoir disposed within the housing.

These and further objects of the present invention will be more readily apparent to those skilled in the art from a further consideration of this disclosure, particularly when viewed in the light of the drawings, in which:

FIGURE 2 is a sectional view taken along the line 2—2 of FIGURE 1;

FIGURE 3 is a side elevational view of the clutch and housing assembly of FIGURE 1 partly broken away and in sections as illustrated by the line 3—3 of FIGURE 1;

FIGURE 4 is a fragmentary sectional view taken along the line 4—4 of FIGURE 3; and FIGURE 5 is a fragmentary sectional view taken along the line 5—5 of FIGURE 1.

Figure 1:
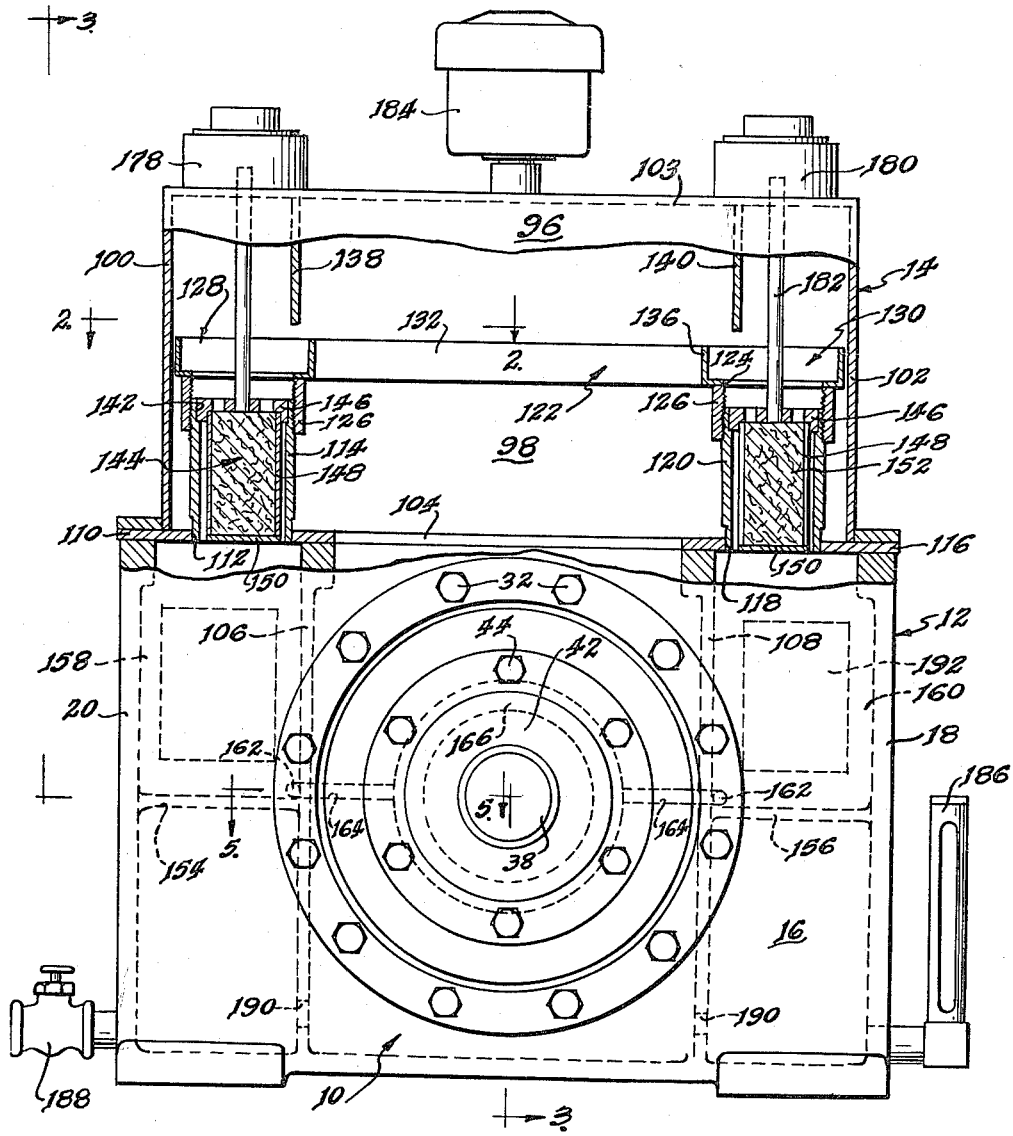
FIGURE 1 is a front elevational view of a one-way clutch and housing assembly, the view being partly broken away and in sections.

As illustrated in the figures, the clutch housing is designated 10 and is provided with a lower portion 12 and an upper portion 14. The lower portion 12 is generally rectangular in shape, and may be described as having a face 16, side walls 18 and 20, a back 22, a bottom 24, and a top 26. The face 16 has a circular opening 28 and a bearing mounting plate 30 is sealed to the face 16 over the opening 28, and a plurality of bolts 32 maintaining the mounting plate in position. The mounting plate 30 has a central bore 34, and a ball bearing assembly 36 is mounted in the bore 34. A shaft 38 is journaled within the ball bearing assembly 36 and extends to the exterior of the housing 10. A circular ring 40, C-shaped in cross-section, is disposed exterior to the housing 10 about the shaft 38 and confronting the ball bearing assembly 36, and a cover ring 42 is disposed about the ring 40 and mounted on the mounting plate 30 by a plurality of bolts 44. The ring 40 prevents lubricant from leaking from the housing 10 and keeps dirt and dust out of the housing.

A second shaft 46 is mounted coaxially with the first shaft 38 on a second ball bearing assembly 48 mounted in a circular aperture 50 in the back 22 of the housing 10. A second ring 52 substantially identical in cross-section to ring 40, is disposed about the second shaft 46, and a cover ring 54 is disposed about the second ring 52.

The housing 10 has a partition 56 extending through the lower portion 12 thereof parallel to the face and back of the housing. The partition 56 has a bore 58 aligned with the bore 34 and aperture 50, and a third ball bearing assembly 60 is mounted in this bore 58. The second shaft 46 is also journaled in this third ball bearing assembly 60.

One end of the second shaft 46 is disposed between the ball bearing assembly 60 and the ball bearing assembly 36, and this end of the shaft 46 carries the inner race 62. The perimeter of the inner race 62 is provided with a plurality of indentations 64, and these indentations defined inclined planes 66. A slot 68 is disposed at the radially inward ends of the inclined planes 66, and a trailing surface 70 extends generally radially therefrom.

A roller bearing asembly 72 is disposed about the inner race 62, and a roller bearing 74 confronts each of the indentations 64 of the inner race. Each of the roller bearings 74 is separated by a spacer 76 having concave surfaces confronting and aligned with the cylindrical surfaces of the confronting roller bearings. The spacers 76 are interconnected at their ends by a pair of rings 78, illustrated in FIGURE 3, to complete a cage for the roller bearing assemblies 72.

An outer race 80 is disposed coaxially about the inner race 62 and has a cylindrical surface 82 which confronts and abuts the roller bearings 74 of the roller bearing assembly 72. The cylindrical surface 82 is disposed at a distance less than the diameter of the roller bearings 74 from the inner race 62, so that roller bearings disposed on the inclined planes will wedge between the inner and outer races. However, the indentations 64 are sufficient to permit the roller bearings 64 to roll freely therein when rotated toward the trailing edges 70 of the indentations. The outer race 80 is provided with a side ring 84 which extends toward the shaft 46 between the inner race 62 and the partition 56. The side ring 84 has an aperture 86 which is disposed coaxially about the shaft 46, and a ball bearing assembly 88 is mounted in this aperture 86 and journaled about the shaft 46. In this manner, the outer race 80 is maintained in precise coaxial relationship with the second shaft 46.

A cup member 90 is mounted on the end of the first shaft 38 disposed adjacent to the second shaft 46, and the cup member 90 has an outwardly extending flange 92 which is secured to the outer race 80. In this manner, the outer race is mounted on the first shaft 38, while the inner race 62 is mounted on the second shaft 46.

The housing 10 is provided with a pool of lubricant 94, namely oil, which extends to a sufficient level to contact the surface of the outer race 80. In normal usage, the shaft 38 is the driven shaft which is connected to a load, and the shaft 46 is the driving shaft which is connected to the source of power. When the load is driven by an auxiliary source, the shaft 46 is in a stationary position, but the shaft 38 continues to rotate in a free wheeling condition. Therefore, in all operating conditions the outer race 80 is rotating. The outer race 80 sprays small particles of oil against all of the surfaces of the interior of the housing 10, and it is this oil spray which is trapped and provides lubrication for the one-way clutch, as will be described hereinafter.

The upper portion 14 of the housing is rectangular and extends above the outer race 80 of the one-way clutch. This portion 14 of the housing also has a front 96, a back 98, and sides 100 and 102. In addition, the upper portion 14 of the housing has a top 103 but it is open at the bottom forming an aperture 104 confronting the clutch.

The lower portion 12 of the housing has a partition 106 disposed on one side of the shafts 38 and 46, and a second partition 108 disposed on the other side of the shafts 38 and 46, these partitions being parallel to the walls 18 and 20. A cover 110 extends between the wall 20 and the partition 106, and this cover is provided with a circular opening 112. A sleeve 114 is mounted in the circular opening 112 and extends into the upper portion 14 of the housing 10. In like manner, a cover 116 extends between the partition 108 and the wall 18, and this cover 116 also has a circular opening 118 therein. A second sleeve 120 is mounted in this opening 118 and extends into the upper portion 14 of the housing. As is clear from FIGURE 2, two sleeves 114 extend from openings in the cover 110, and two sleeves 120 extend from openings in the cover 116, one of the sleeves extending from each cover being disposed adjacent to the face 16 of the housing and the other adjacent to the back 22 of the housing.

A tray 122 is disposed within the upper portion 14 of the housing, and this tray has an opening 124 confronting each of the sleeves 114 and 120. Threaded nipples 126 extend from the openings 124, and engage the ends of the sleeves 114 and 120 to mount the tray 122 on the sleeves. The tray 122 is disposed on a plane parallel to the top 26 of the housing 10, and it is intended that this plane be disposed horizontally.

The tray 122 may be considered to have three portions, a first rectangular portion 128 which is mounted on the sleeves 114, a second rectangular portion 130 which is mounted on the sleeves 120, and an interconnecting trough portion 132 which extends between the rectangular portions 128 and 130. All three of these portions have a flat base 134 which is disposed on a common plane, and side walls 136 which extend normally therefrom. It is to be noted that the trough portion 132 of the tray 122 confronts the cylindrical outer race 80, leaving openings confronting the side ring 84 and flange 92. Since the side ring 84 and flange 92 are immersed within the oil pool 94, substantial quantities of oil are thrown through these openings on opposite sides of the trough 132 and collected in the rectangular portions 128 and 130 of the tray. The trough 132 serves the function of equalizing the oil level in the two rectangular portions 128 and 130.

A plate 138 is disposed parallel to the side 100 of the upper portion 14 of the housing and disposed over the rectangular portion 128 of the tray 122. In like manner, a plate 140 is disposed parallel to the side 102 and directly over the rectangular portion 130 of the tray 122. Lubricant spray striking these plates is prevented from striking the sides 100 and 102, and therefore this lubricant must drip down into the rectangular portions 128 and 130 of the tray 122. This prevents the lubricant from running down the sides 100 or 102 and returning directly to the oil pool 94 in the lower portion 12 of the housing 10.

The ends of each of the sleeves 114 and 120 disposed within the nipples 126 are provided with recesses 142 which receive a lubricant filter 144. These filters are best illustrated in FIGURE 1 and have a perforated disc 146 which forms a tight fit within the recess 142. A porous cylindrical sleeve 148, which may be of wire mesh screen, extends from the disc 146 coaxially within each sleeve 114 or 120 to terminate in a second disc 150 at the lower end thereof. This disc 150 is not perforated and forms a seal so that lubricant must flow through the porous sleeve 148. A mass of filter material 152 is disposed within the sleeve 148. In this manner, oil or lubricant thrown into the tray 122 passes through the perforations in the disc 146, through the filter material 152 and the porous sleeve 148 to enter the lower portion 12 of the housing 10.

A horizontal plate 154 extends from the partition 106 to the side wall 20 of the lower portion 12 of the housing, and a second horizontal plate 156 extends from the partition 108 to the side wall 18. In this manner, two sealed reservoirs are formed directly below the sleeves 114 and 120, and oil passing through the filters 144 collects in these reservoirs. These reservoirs are designated 158 and 160 in FIGURES 1 and 2.

The reservoir 158 communicates with a bore 162 in the face 16 of the lower portion 12 of the housing 10 which is disposed in the region of the face between the plate 154 and the partition 106. A bore 162 extends through the face 16 to communicate with a channel 164 in the mounting plate 30. The channel 164 extends essentially horizontally toward the shaft 38 and terminates in a circular recess 166 adjacent to the bore 34 in the mounting plate 30. Since the ball bearing assembly 36 is mounted in this bore 34, lubricant flowing through the channel 164 is in contact with this ball bearing assembly 36. A plurality of spaced slots 168 are cut in the cover ring 42 and extend between the recess for the seal 40 to permit lubricant to flow from the circular recess 166 into contact with the ball bearings of the ball bearing assembly 36. In this manner, a direct flow of lubricant is obtained through the ball bearing assembly 36 to the interior of the housing.

As best illustrated in FIGURE 3, the mounting plate 30 is provided with an inwardly extending lip 170 which extends within an outwardly extending lip 172 disposed on the cup member 90 at a diameter from the shafts 46 and 38 slightly greater than that of the lip 170. Both of the lips 170 and 172 are circular and coaxially disposed about the shafts. In this manner, lubricant flowing through the ball bearing assembly 36 is guided onto the lip 172. The cup member 90 also is provided with a plurality of bores 174 which extend therethrough adjacent to the inner edge of the lip 172, thereby providing a flow of lubricant to the roller bearing assembly 72. To prevent an excessive build-up of lubricant between the inner race 62 and outer race 80 of the clutch, a plurality of bores 176 are disposed in the side ring 84 in alignment with the interior surface of the outer race 80.

Removable covers 178 and 180 are disposed in openings in the top 103 of the upper portion 14 of the housing 10. These covers directly confront the perforated discs 146 of the filters 144, and a stem 182 extends upwardly from each of the filters 144 to permit removal of the filters during operation. It is to be noted that the plates 138 and 140 prevent excessive oil spray from the open caps 178 and 180 during this operation. A breather 184 is also mounted on the top 103 of the upper portion 14 of the housing 10.

An oil level indicator 186 communicates with the lower portion of the housing 10 in order to measure the level of the lubricant during operation and assure adequate lubricant supply. This lubricant level will be limited by the position of the outer race 80 of the clutch, since excessive lubricant is removed to the tray 122 as a result of rotation of the outer race. A drain plug 188 is also in communication with the lower portion of the housing 10 so that the pool of lubricant may be drained for maintenance purposes. It is to be noted that the partitions 106 and 108 extend below the plates 154 and 156 to form two chambers on opposite sides of the lower portion 12 of the housing 10. Apertures 190 are disposed between these chambers and the central portion of the lower portion 12 of the housing 10 to permit free flow of oil from these chambers.

The upper portion 14 of the housing not only provides adequate room for the tray 122 and filters 144, but also provides an increased exterior surface to the housing 10 for the purpose of adequate air cooling. During operation considerable heat is generated by the one-way clutch, and the oil spray in the tray and against the walls of the housing provides adequate cooling to maintain safe temperatures over long periods of operation.

The reservoirs 158 and 160 are relatively large, and under some conditions of operation, these reservoirs can be completely filled with lubricant. This condition results when the spray of lubricant caught by the tray 122 exceeds the flow of lubricant through the channels 164. Under these conditions, a large quantity of lubricant would be required to maintain the pool 94 of lubricant in the lower portion 12 of the housing 10. However, when the clutch ceases to operate, this lubricant will all drain down into the lower portion of the housing 10, creating an excessive quantity of lubricant and immersing the outer race 80 of the clutch to an excessive extent. For this reason, the capacity of each of the reservoirs 158 and 160 is limited by a sealed hollow steel drum 192 disposed therein. A severe restriction in the flow of lubricant from the reservoirs 158 and 160 merely results in an overflow from the tray 122, and eliminates the need for excessive quantity of lubricant within the housing 10. A level gauge 193 is in communication with reservoir 158 to measure the lubricant level therein.

It is under some conditions desirable to lock the shaft 46, such conditions often existing when the driving source of motor coupled to the shaft 46 is to be replaced or serviced. For this reason, a brake mechanism comprising a threaded bolt 194 is illustrated in the figures. The bolt 194 is provided with a handle 196 exterior to the housing 10, and may be tightened against the shaft 46 to lock it in position.

From the foregoing disclosure, those skilled in the art will readily devise many applications and modifications for the invention herein set forth. It is therefore intended that the scope of the present invention be not limited by the foregoing disclosure, but rather only by the appended claims.

The invention claimed is:

1. A one-way clutch assembly comprising, in combination: a shaft; a clutch having a generally cylindrical inner race, a generally cylindrical outer race, a plurality of drive elements disposed between the inner race and outer race, rotational torque in one direction wedging the drive elements between the races and torque in the other direction releasing the drive elements, a member mounted on the outer race normal to the axis thereof and on the shaft for mounting the outer race coaxially on the shaft, said member having a circular lip extending coaxially from the outer side of the member and a bore extending through the member from the inner surface of the lip; a housing disposed about the clutch having a wall with an opening accommodating the shaft; a bearing mounted in the opening of the wall and journaled about the shaft; and means for lubricating the bearing and clutch comprising a pool of liquid lubricant disposed within the housing in contact with a portion of the outer race of the clutch, a tray open at the top disposed above the pool of lubricant and adapted to receive a spray of lubricant from rotation of the outer race, means defining a passage from the tray to the bearing and a projection extending from the wall of the housing below the bearing toward the clutch, said projection terminating radially inward of the lip of the member and between the member and the shaft.

2. A one-way clutch assembly comprising, in combination: a shaft; a clutch having a generally cylindrical inner race, a generally cylindrical outer race, a plurality of drive elements disposed between the inner race and outer race, rotational torque in one direction wedging the drive elements between the races and torque in the other direction releasing the drive elements, a member mounted on the outer race normal to the axis thereof and on the shaft for mounting the outer race coaxially on the shaft, said member having a circular lip extending coaxially from the outer side of the member and a bore extending through the member from the inner surface of the lip; a housing disposed about the clutch having a wall with an opening accommodating the shaft; a bearing mounted in the opening of the wall and journaled about the shaft; and means for lubricating the bearing and clutch comprising a pool of liquid lubricant disposed within the housing in contact with a portion of the outer race of the clutch, a tray open at the top disposed above the pool of lubricant and adapted to receive a spray of lubricant from rotation of the outer race, means defining a closed compartment within the housing below the tray including the wall of the housing, said wall of the housing having a channel therein extending from an opening communicating with the closed compartment to the bearing, a sleeve extending from an opening in the tray to the closed compartment, a projection extending from the wall of the housing below the bearing toward the clutch, said projection terminating radially inward of the lip of the member and between the member and the shaft, and means providing communication between said bearing and said lip for the flow of lubricant from said bearing.

3. A one-way clutch assembly comprising the elements of claim 2 in combination with a cylindrical lubricant filter disposed within the sleeve from the tray to the compartment.

4. A one-way clutch assembly comprising, in combination: a shaft; a clutch having a generally cylindrical inner race, a generally cylindrical outer race, a plurality of drive elements disposed between the inner race and outer race, rotational torque in one direction wedging the drive elements between the races and torque in the other direction releasing the drive elements, a member mounted on the outer race normal to the axis thereof and on the shaft for mounting the outer race coaxially on the shaft, said member having a circular lip extending coaxially from the outer side of the member and a bore extending through the member from the inner surface of the lip; a housing disposed about the clutch having a reservoir at the bottom thereof for a pool of liquid lubricant, said reservoir having a wall with an opening therein and a closed compartment formed including said wall, a bearing mounting plate sealed to the exterior surface of said housing having a bore extending therethrough and a circular recess on the exterior surface thereof extending from the bore, a bearing assembly mounted within the bore and journaled about the shaft, the wall of said housing having a bore extending therethrough from the reservoir and communicating with a channel in the mounting plate, said channel extending from the bore to the recess, a cover ring mounted coaxially about the shaft on the exterior surface of the mounting plate and abutting the bearing assembly, said cover ring having an annular recess therein confronting the shaft and bearing assembly and a slot extending from the recess therein to the circular recess of the mounting plate, and a ring seal disposed within the recess of the cover ring.

5. A one-way clutch assembly comprising, in combination: a shaft; a clutch having a generally cylindrical inner race, a generally cylindrical outer race, a plurality of drive elements disposed between the inner race and outer race, rotational torque in one direction wedging the drive elements between the races and torque in the other direction releasing the drive elements, a member mounted on the outer race normal to the axis thereof and on the shaft for mounting the outer race coaxially on the shaft, said member having a circular lip extending coaxially from the outer side of the member and a bore extending through the member from the inner surface of the lip; a housing disposed about the clutch having a reservoir at the bottom thereof for a pool of liquid lubricant, said reservoir having a wall with an opening therein and a closed compartment formed including said wall, a bearing mounting plate sealed to the exterior surface of said housing having a bore extending therethrough and a circular recess on the exterior surface thereof extending from the bore, a bearing assembly mounted within the bore and journaled about the shaft, the wall of said housing having a bore extending therethrough from the reservoir and communicating with a channel in the mounting plate, said channel extending from the bore to the recess, a cover ring mounted coaxially about the shaft on the exterior surface of the mounting plate and abutting the bearing assembly, said cover ring having an annular recess therein confronting the shaft and bearing assembly and a slot extending from the recess therein to the circular recess of the mounting plate, a ring seal disposed within the recess of the cover ring, a tray disposed within the housing above the reservoir and positioned to receive a lubricant spray, and a sleeve extending from the tray to the reservoir.

6. A self-lubricating clutch mechanism of the type including a driving shaft, bearings journalling said driving shaft for rotation, a driven shaft, bearings journalling said driven shaft for rotation, and a clutch mechanism coupling said shafts in driving relation, said clutch mechanism comprising a plurality of drive elements effecting driving relation between said driving and driven shafts, the improvement comprising: a stationary casing disposed about said shaft and said clutch mechanism to enclose the space therein, a pool of lubricant in said casing, a peripheral wall on said clutch mechanism extending into said pool and on rotation elevating a flow of lubricant from said pool, collecting means receptive of lubricant from said flow, a filtering system, means conducting lubricant flow from said collecting means through said filtering system, and a plurality of channels coupled to the filtering system to receive lubricant exiting from the filtering system, said plurality of channels being directed toward the bearings of one of said shafts, a lip on said housing in the path of flow of lubricant from said plurality of channels extending toward the drive elements in said clutch mechanism, and means in said clutch wall for preventing the storage of excess lubricant adjacent said drive elements.

7. A one-way clutch assembly comprising in combination: a shaft; a clutch having a generally cylindrical outer race, a generally cylindrical inner race, and a plurality of drive elements disposed between the races such that rotational torque in one direction wedges the elements between the races for joint rotation, and torque in the other direction releases the drive elements, a drive member mounted coaxially on said shaft and connected to the outer race for rotation therewith, a circular lip on said drive member disposed coaxially about said shaft in a direction outward of said clutch drive elements; a stationary housing enclosing said clutch and including a lower portion below said clutch, an upper portion above said clutch and an intermediate portion in which said shaft is journalled for rotation, said lower portion comprising an internally open volume for storing therein a pool of lubricant into which the bottom of said outer race extends, a horizontal tray in the upper portion of said housing receptive of lubricant raised from said pool by rotation of said outer race, a conduit in communication with said tray for passing therethrough lubricant received by said tray, a filter element in said conduit for removing particles from the lubricant flowing through said conduit, a storage reservoir in said housing in communication with the conduit receptive of all lubricant passed by said filtering element, and a channel in said housing leading from said reservoir to an exit opening, a circular lip on said housing overlapping said circular lip on said drive member and positioned to receive lubricant from said exit opening, and a bore in said drive member adjacent to said circular lip of the drive member for receiving lubricant emitted from said exit opening for transmission to the drive elements of said clutch.

8. A clutch assembly as claimed in claim 7, in which the housing is provided with flow restricting means for limiting the flow through said housing channel toward said drive members.

References Cited by the Examiner
UNITED STATES PATENTS

| | | | |
|---|---|---|---|
| 1,554,081 | 9/25 | Garrett | 192—113.2 XR |
| 2,220,824 | 11/40 | Olcott | 192—113.2 XR |
| 2,285,754 | 6/42 | Money | 192—113.2 XR |
| 2,826,096 | 3/58 | Hoge | 192—45 XR |
| 2,884,107 | 4/59 | Frankel | 192—113.2 XR |

DAVID J. WILLIAMOWSKY, *Primary Examiner.*

THOMAS J. HICKEY, *Examiner.*